United States Patent [19]

Sinclair et al.

[11] Patent Number: 5,065,099
[45] Date of Patent: Nov. 12, 1991

[54] COIL ARRAY FOR A HIGH RESOLUTION INDUCTION LOGGING TOOL AND METHOD OF LOGGING AN EARTH FORMATION

[75] Inventors: Paul L. Sinclair, Clear Lake Shores; Robert W. Strickland, Austin, both of Tex.

[73] Assignee: Halliburton Logging Services, Inc., Houston, Tex.

[21] Appl. No.: 604,542

[22] Filed: Oct. 29, 1990

Related U.S. Application Data

[63] Continuation-in-part of Ser. No. 474,230, Feb. 2, 1990, abandoned, and a continuation-in-part of Ser. No. 478,024, Feb. 9, 1990, abandoned.

[51] Int. Cl.$^5$ ............................................. G01V 3/28
[52] U.S. Cl. .................................................. 324/339
[58] Field of Search ............... 324/323, 332, 333, 334, 324/338, 339, 344

[56] References Cited

U.S. PATENT DOCUMENTS 2,582,314  1/1952  Doll ..................................... 324/339
4,472,684  9/1984  Schuster .......................... 324/323 X Primary Examiner—Kenneth A. Wieder
Assistant Examiner—Warren S. Edmonds
Attorney, Agent, or Firm—William J. Beard

[57] ABSTRACT

An induction tool including a coil array having a plurality of transmitter coils and a plurality of receiver coils. Each plurality of coils is symmetrically arranged on an insulated mandrel about a selected point. The induction tool also includes an oscillator circuit that provides an alternating frequency signal to the transmitter coils. A receiver circuit is connected to the receiver coils to measure signals indicative of the voltages induced on these receiver coils to the surface. By varying the spacing between the receiver coils and transmitter coils it is possible to independently vary the vertical and radial measurement capabilities of the tool of the present invention. A dual induction tool having high vertical resolution is also disclosed. The dual induction tool includes a pair of transmitter/receiver coil arrays, each transmitter/receiver coil array having a different transmitter-to-receiver coil spacing and substantially indentical vertical resolution. A single receiver coil is located at a selected point on an insulated sonde and a pair of variable symmetrically disposed bucking coils are located on either side of the receiver coil. Two pairs of identical transmitter coils are similarly symmetrically disposed on either side of the receiver coil. In a preferred embodiment, each pair of transmitter coils is alternately energized and the bucking coils are selectively adjusted to compensate for the variation in transmitter-to-receiver coil spacing.

14 Claims, 7 Drawing Sheets

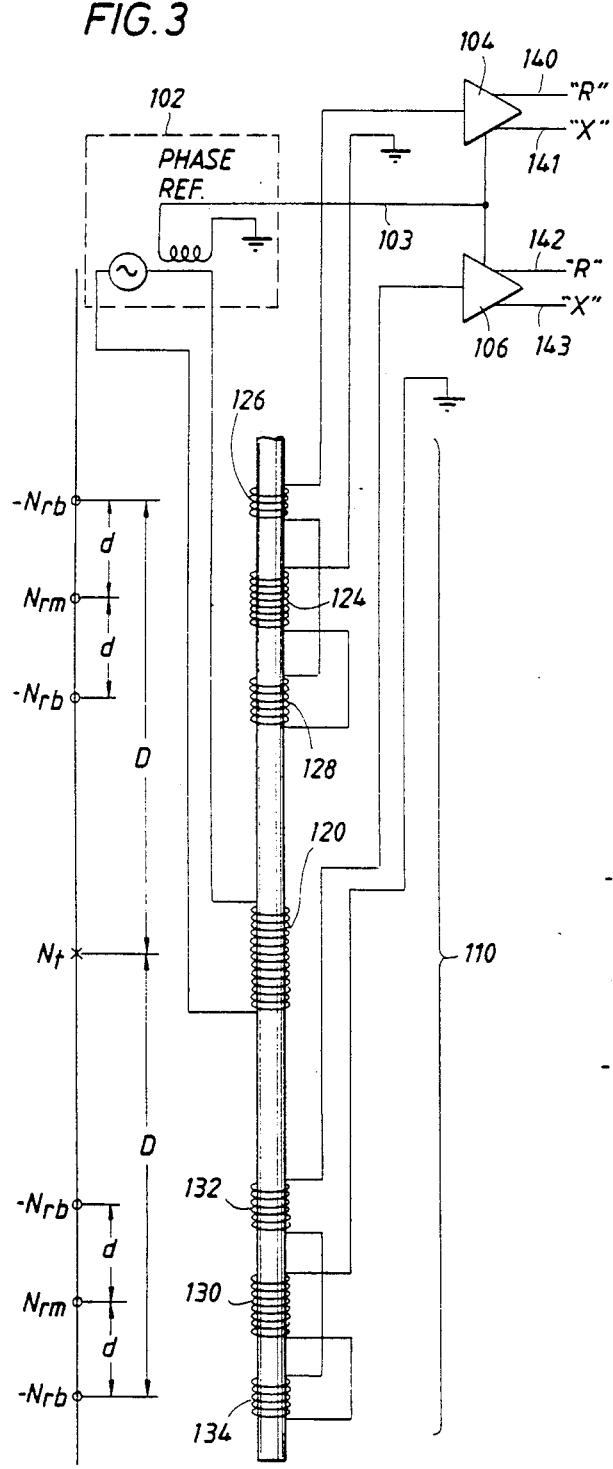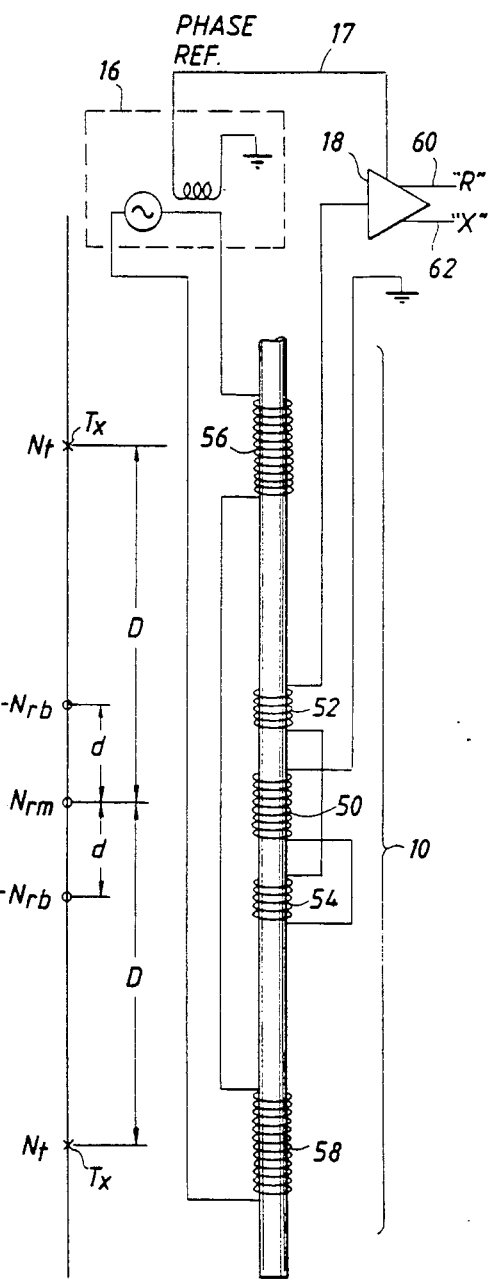

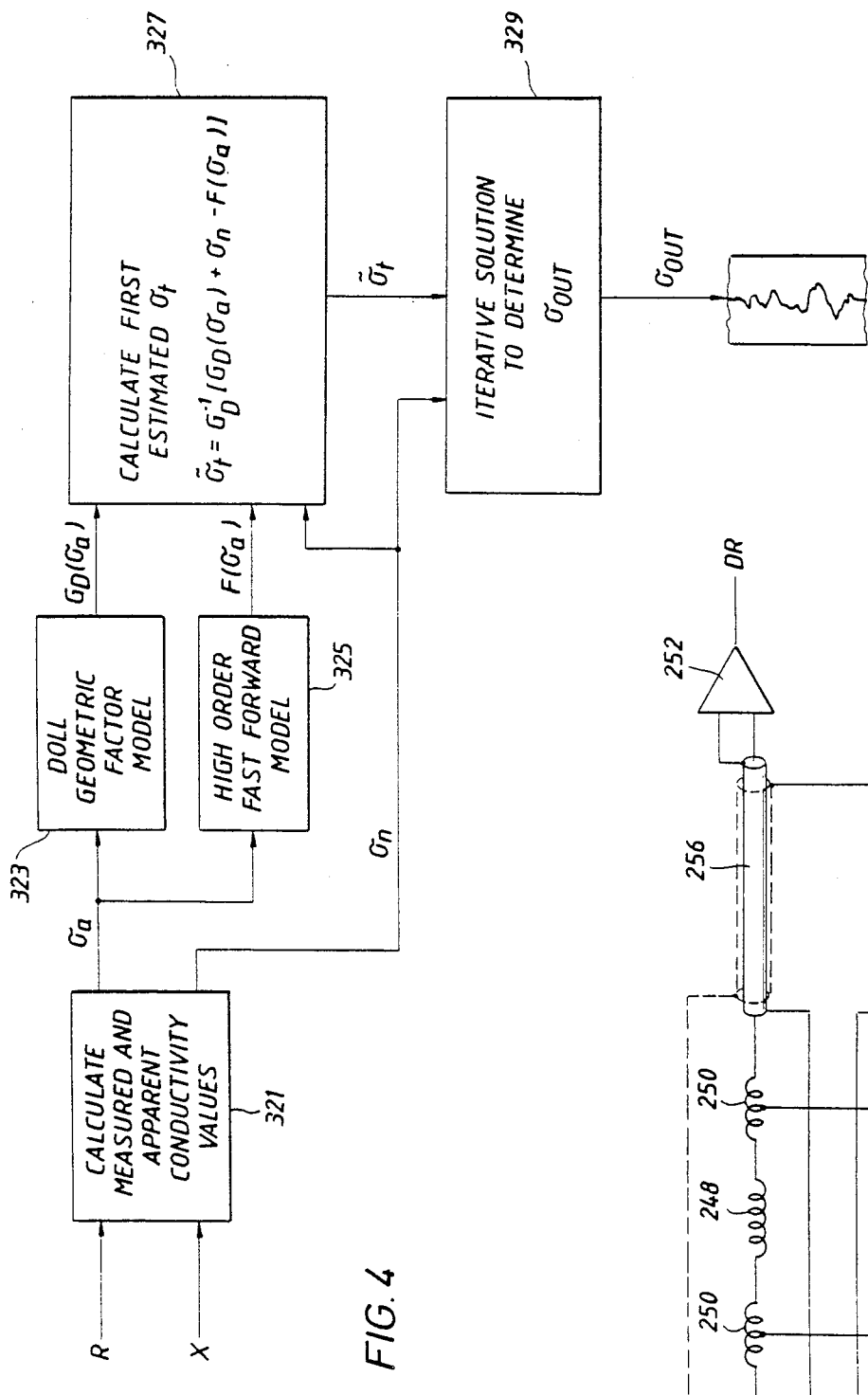

COIL ARRAY FOR A HIGH RESOLUTION INDUCTION LOGGING TOOL AND METHOD OF LOGGING AN EARTH FORMATION

This application is a continuation-in-part of co-pending application Ser. No. 07/474,230 to filed Feb. 2, 1990 and co-pending application Ser. No. 07/478,024 filed Feb. 9, 1990, which are hereby incorporated by reference.

BACKGROUND OF THE INVENTION

The present invention relates in general to well logging tools and in particular to well logging tools for measuring formation resistivity.

Induction well logging tools were originally designed to provide a resistivity measurement in wells drilled with electrically insulating, oil-based mud. Since their introduction, their use has spread to wells drilled with water-based muds of moderate-to-high electrical conductivities. The basic element in all multi-coil induction tools is the two-coil sonde. The two-coil sonde consists of a single transmitter coil and a single receiver coil wrapped around an insulating mandrel. The transmitter coil is driven by an oscillating current at a frequency of a few tens of kilohertz. The resulting magnetic field induces eddy currents in the formation which are coaxial with the tool. These eddy currents produce a magnetic field which in turn induces a voltage in the receiver coil. This induced voltage is then amplified, and the component of the voltage that is in-phase with the transmitter current is measured and multiplied by a tool constant to yield an apparent conductivity signal. This apparent conductivity is then recorded at the surface as a function of the depth of the tool.

The two-coil sonde has several practical limitations. Its response is adversely affected by several factors including the borehole, adjacent beds, and mud filtrate invasion. Also, the two-coil sonde is difficult to implement because of the large direct mutual coupling between the coils. Even though this mutual signal is out of-phase with the transmitter current, it is a problem because a very small phase shift in the electronics can cause this mutual coupled signal to "leak" into the apparent conductivity signal. For these reasons, it is the standard practice in the industry to construct induction logging tools with coil arrays which include additional coils. Typically, there are several transmitter coils and several receiver coils. In certain applications all of the transmitter coils may be connected in series into one circuit. Similarly, all of the receiver coils may be connected in series in a separate circuit. The additional coils served to cancel out the various adverse effects listed above. Such arrays are generally termed "focused arrays".

The following are terms of art that are used often to compare various induction tools. The "vertical resolution" of a tool is a measure of the thinnest bed that a tool can detect. That is, a tool may accurately estimate the thickness of beds that are thicker than it's "vertical resolution". A tool can also accurately locate a bed boundary to within the tolerance of its "vertical resolution". There is still a significant error in the apparent conductivity reading in a thin bed due to signals from adjacent beds; however, so long as the thin bed is thicker than the vertical resolution of the tool, the tool can estimate the thickness of the bed. This error in the apparent conductivity reading of a thin bed due to the signal coming from adjacent beds is referred to as "shoulder effect." In known induction tool arrays, the additional coils are arranged to cancel out much of this shoulder effect.

It is also possible for a tool to have good vertical resolution but poor shoulder effect. Such a tool would be able to accurately define bed boundaries but would give poor estimates of the conductivities of these thin beds. Vertical resolution and shoulder effect are two aspects of the vertical focusing of an induction tool coil array.

The "depth of investigation" of a tool is a measure of how deeply the tool sees into the formation. The "depth of investigation" is defined as the radius of the cylinder from which half the apparent conductivity signal comes. The "borehole effect" is a measure of how much signal comes from the borehole as compared to the formation. In conventional arrays, coils are arranged to cancel much of the signal coming from near the tool so that the "depth of investigation" will be large and the "borehole effect" will be small.

The foregoing discussion can be understood by assuming that a tool may be operated at a sufficiently low frequency so that there is no significant attenuation of the transmitted signal as the signal propagates through the formation. In practice, such attenuation cannot be neglected since it reduces the transmitted signal proportionately more in conductive formations. This error is commonly referred to as "skin effect." Prior art practitioners generally attempt to design a coil array which has moderate skin effect at the highest conductivity of interest in logging situations and then correct for the skin effect at the surface. The skin effect correction is typically a correction which yields the true conductivity of a homogeneous formation.

In the case of conventional induction tool arrays, coils must be positioned to define the tool's vertical resolution, depth of investigation, as well as to compensate for borehole and shoulder effect. In addition, the coils must minimize the mutual coupling between transmitter coils and receiver coils, as this signal is very large when compared to most formation signals. In known coil arrays, the position and strength of each coil controls each of these aforementioned effects. Because each of these effects may change as a coil is modified, it is difficult to design a coil array optimized to reduce all of these effects simultaneously. The different effects interact, as one effect is reduced, another is increased. Conventional coil array designs therefore must be a compromise between sharp vertical resolution and deep radial penetration into the formation.

It would be desirable for an induction logging tool to permit variation in depth of investigation or vertical resolution independently without compromising the other parameter. Previously, such a tool has not been available.

In most commercial applications, it is also desired to investigate the strata surrounding a borehole to different depths of investigation in order to determine the diameter of invasion of the strata by borehole fluids. This requires at least two measurements with contrasting radial response and ideally identical vertical resolution so that differences in the logs obtained will be due to radial anomalies in the formations such as invasion.

Most prior art dual induction tools utilize deconvolution filters to match dissimilar vertical responses of two induction coil arrays with inherently different vertical resolutions by smoothing out the response of the array with the sharper vertical resolution and degrading it to match the vertical response of the second array. This approach is not desirable in view of the degradation of vertical resolution which is necessary to match the coil arrays utilized to investigate the formation.

Thus, a need exists for a dual induction tool capable of investigating multiple depths of investigation while maintaining substantially identically vertical resolution for all coil arrays.

SUMMARY OF THE INVENTION

It is therefore one object of the present invention to provide an improved dual induction tool.

It is another object of the present invention to provide an improved dual induction tool having high vertical resolution.

It is another object of the present invention to provide a new induction tool coil array design wherein different coils of the array control the vertical and radial focusing, so such an array may possess both sharp vertical resolution and deep radial penetration without the compromises present in known arrays.

An induction tool is provided which includes a coil array having a first plurality of transmitter coils and a second plurality of receiver coils. The transmitter and receiver coils are symmetrically arranged on an insulated sonde about a selected point on the insulated sonde. The induction tool further may include an oscillator circuit connected to the transmitter coils to provide a selected frequency transmission signal to the transmitter coils. A receiver circuit is preferably connected to the receiver coils for receiving signals from the receiver coils.

In one embodiment of the present invention a centrally located transmitter coil assembly may be provided. The transmitter coil assembly is positioned symmetrically about a selected point on an insulated body. A plurality of receiver coils may be connected in series in this embodiment and have the same sense. These receiver coils are positioned symmetrically about the selected point on the insulated body and the transmitter coil assembly. An oscillator circuit is utilized to provide a selected frequency transmission signal to the transmitter coil assembly and a receive: circuit is similarly connected to the receiver coils. In this embodiment the oscillator circuit also provides a phase reference signal to the receiver circuit. The receiver circuit in turn detects an in-phase signal and out-of-phase signal. Each of the receiver coils may further include two bucking coils that are symmetrically positioned about a respective receiver coil and, in one depicted embodiment, the bucking coils are connected in series and wound in opposite sense to the respective receiver coil. Also, in this embodiment, the induction tool further includes a data processor connected to the receiver circuit for analyzing the receiver coil signals and providing shoulder and skin effect computational corrections to compute a corrected log signal.

A second embodiment of the present invention includes an induction tool having a receiver coil assembly positioned symmetrically about a selected point of an insulated body. Also included in this second embodiment is a second plurality of transmitter coils. The transmitter coils are positioned symmetrically about the selected point of the insulated body and the receiver coil assembly. This induction tool also includes an oscillator circuit that provides a selected frequency transmitter signal to the transmitter coils. Also provided is a receiver circuit connected to the receiver coil assembly for receiving signals from the receiver coils. In this embodiment the receiver circuit is coupled to the oscillator circuit to receive a phase reference signal enabling the receiver circuit to detect an in-phase receiver coil signal and an out-of-phase receiver coil signal. In this alternative embodiment, each of the transmitter coils may include two bucking coils symmetrically positioned about a respective transmitter coil, each bucking coil being connected in series and being wound in opposite sense to its respective transmitter coil. A data processor connected to the receiver circuit may provide shoulder and skin effect computational corrections to the receiver circuit signals in order to compute a corrected log signal for the tool.

An induction tool may also be provided with multiple transmitter/receiver coil arrays each transmitter/receiver coil array having a different transmitter-to-receiver spacing and substantially identical vertical resolution. A single receiver coil is located at a selected point on an insulated sonde and a pair of variable symmetrically disposed bucking coils are located on either side of the receiver coil. Two pairs of identical transmitter coils are similarly symmetrically disposed on either side of the receiver coil. In a preferred embodiment of the present invention each pair of transmitter coils is alternately energized and the bucking coils are selectively adjusted to compensate for the variation in transmitter-to-receiver coil spacing.

The above as well as additional objects, features, and advantages of the invention will become apparent in the following detailed description.

BRIEF DESCRIPTION OF THE DRAWINGS

The novel features believed characteristic of the invention are set forth in the appended claims. The invention itself; however, as well as a preferred mode of use, further objects and advantage thereof, will best be understood by reference to the following detailed description of an illustrative embodiment when read in conjunction with the accompanying drawings, wherein:

FIG. 2 is a schematic representation of a first embodiment of the present invention;

FIG. 3 is a schematic diagram of a second embodiment of the present invention;

FIG. 4 is a schematic illustration showing the preferred mode of processing on computer 32 of FIG. 1;

FIG. 8 is a schematic representation of the receiver coil of the dual high resolution induction tool of the present invention.

DETAILED DESCRIPTION OF THE PREFERRED EMBODIMENTS

Figure 1:
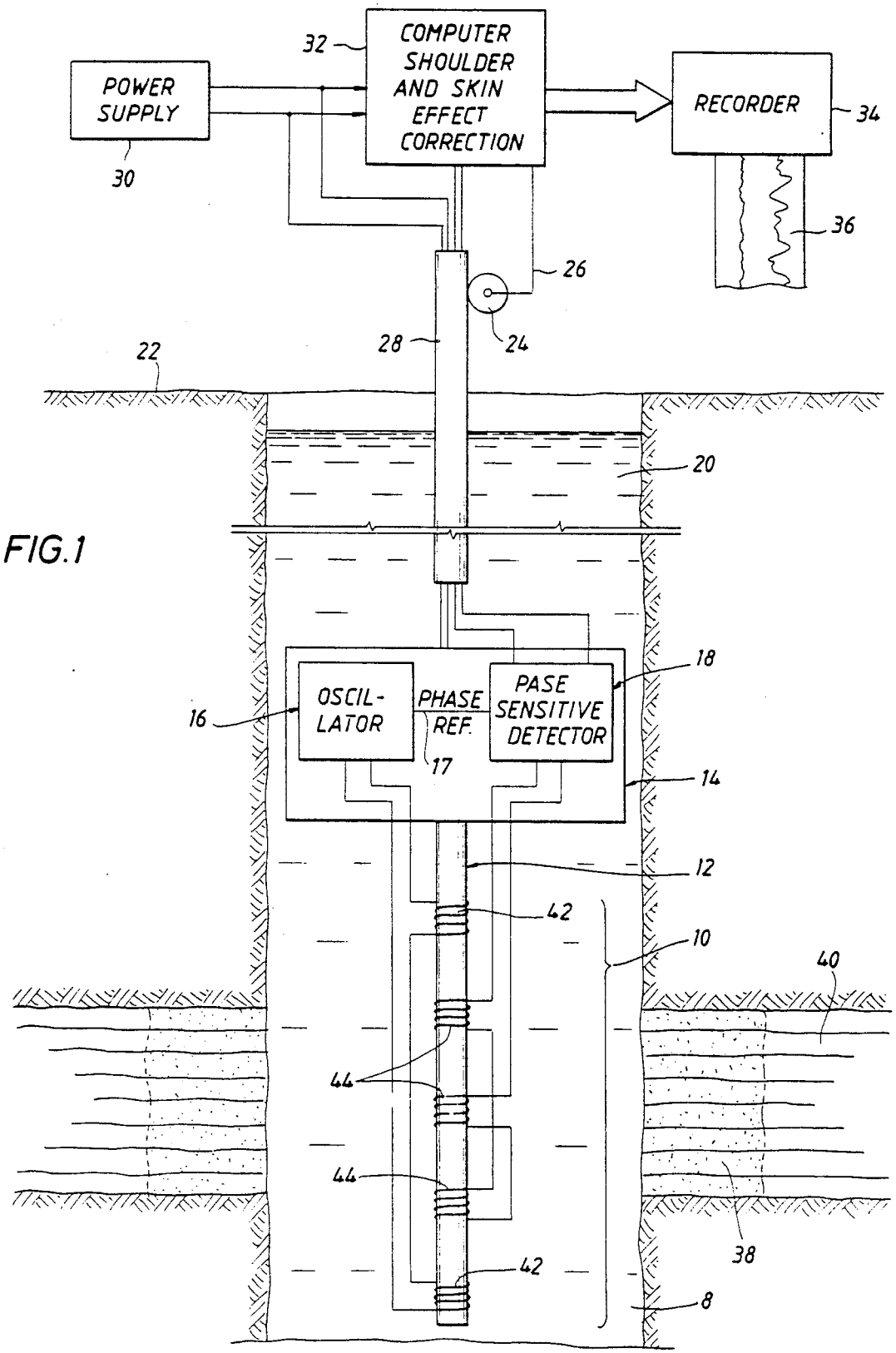
FIG. 1 is a block diagram of one embodiment of the induction tool invention positioned in a borehole.

FIG. 1 is a block diagram of the present invention directed in a borehole 8 surrounded by drilling mud 20.

It should be understood by those skilled in the art that the dimensions of FIG. 1 are exaggerated to enable a more clear presentation of the discussion. A logging cable 28 is preferably connected to induction tool electronics 14. Logging cable 28 preferably includes both power and signal lines. The induction tool electronic circuitry includes an oscillator circuit 16 and a receiving phase sensitive detector circuit 18. The oscillator circuit provides a reference signal on line 17 to the receiver circuit 18. The oscillator circuit 16 is also connected to the transmitter coils 42 that are positioned on an insulating mandrel 12. The receiver circuit 18 is connected to the receiver coils 44, also positioned on the insulated mandrel 12. The transmitter coils 42 and the receiver coils 44 make up coil array 10. An alternating frequency signal produced by the transmitter oscillator circuit 16 is coupled to the transmitter coils 42 to inductively produce an electromagnetic field which causes eddy currents to flow within the formation. These eddy currents produce a secondary magnetic field which induces a voltage in receiver coils 44. Receiver circuit 18 is connected to receiver coils 44 and transmits the receiver coil signals to a computer 32 located at the earth's surface 22 through the logging cable 23. These received signals are utilized to provide information concerning the resistivity of the formations surrounding the borehole.

Computer 32 is connected to a power source 30 which also provides power to downhole tool electronics 14 through the logging cable 28. A winch 24 is preferably connected to the logging cable to raise and lower the logging tool in borehole 8. In the depicted embodiment of the present invention, winch 24 provides a depth signal on line 26 to computer 32. The computer receives signals from the receiver coil 44 and provides shoulder and skin effect correction computations to compute a corrected log signal which is provided to a recorder 34. Recorder 34 preferably produces a well log 36 which depicts the corrected log signal versus the depth of the tool in the borehole.

Each coil (both receiver and transmitter) includes a number of turns which will be referred to herein as the relative dipole moment of the coil. The dipole moment of a solenoidal coil is approximately proportional to the product of its number of turns, the current passing through it, and the area of its turns. Therefore, when one coil has more turns than another, the dipole moment of that coil is said to be greater than the other. It should therefore be understood that the spatial response of a particular coil array does not change significantly if all of the numbers of turns of the transmitter coils and/or the receiver coils are multiplied by a constant number. Therefore only the relative number of turns of coils will be discussed.

FIG. 2 illustrates one preferred embodiment of the present invention. A pair of transmitter coils 56 and 58 are preferably disposed symmetrically about a selected point on an insulated mandrel 12 and separated by a distance 2D. Each of the transmitter coils 56 and 58 includes $N_t$ turns that are wound in the same sense. A main receiver coil 50 with $N_{rm}$ turns is located at a selected point 51 of the insulated mandrel 12. Also located on mandrel 12 and disposed symmetrically about receiver coil 50 are two bucking receiver coils 52 and 54, each consisting of $N_{rb}$ turns. The bucking receiver coils and the main receiver coil are referred to herein as the receiver coils. These coils are wound in series but the bucking receiver coils 52 and 54 are wound in opposite sense as to the main receiver coil 50. These bucking receiver coils 52 and 54 are so named because their purpose is to buck out the large mutual coupling from the transmitter coils 56 and 58 and to cancel any signals coming from that portion of the formation nearest coil array 10. The bucking receiver coils 52 and 54 are each spaced from the main receiver coil by a distance d. In the embodiment illustrated in FIG. 2, the bucking receiver coils 52 and 54 include fewer turns than the main receiver coil 50 because the bucking receiver coils 52 and 54 are located closer to transmitter coils 56 and 58, making their mutual coupling per turn greater. Oscillator circuit 16 provides an alternating current to each transmitter coil. The resultant induced voltage in the receiver coil array (coils 50, 52 and 54) from the formation includes two components. One component is the in-phase induced voltage and the second component is out-of-phase induced voltage, where the phase is relative to the current in transmitter coils 56 and 58. The receiver circuit 18 receives the phase reference signal 17 in the induced voltage from the receiver coils 50, 52 and 54 to produce an in-phase signal and out-of-phase signal on lines 60 and 62 respectively.

As can be seen, coil array 10 is completely symmetrical about the main receiver coil 50. Further, both the transmitter coils 56 and 58 and the receiver coils 50, 52 and 54 are symmetrical about a selected point 51 on the mandrel 12. This coil arrangement is referred to herein as an SY type of coil array. This arrangement differs from the known coil arrays that are reciprocally symmetrical, that is, the transmitter array is a mirror image of the receiver array.

The relationship of the numbers of turns and coil positions will now be discussed. For purposes of this discussion, it is assumed that the condition of mutual balance exists. In view of this assumption of mutual balance, one of the two transmitter coils 56 and 58 may be omitted from this discussion since the receiver coils 50, 52 and 54 are symmetrical, each transmitter contributes equally to the total mutual inductance. Thus, the receiver coils 50, 52 and 54 are mutually balanced to each transmitter 56 and 58 individually. Assuming that the coils are small enough to be considered point dipoles, the condition for mutual balance for a multi-coil induction tool is disclosed in U.S. Pat. No. 2,582,314 to H.G. Doll. The expression relating to the number of turns and positions of the coil is:

$$\sum_{ij} \frac{N_{ti} N_{rj}}{L_{ij}^3} = 0$$

where $N_{ti}$ is the number of turns on the ith transmitter, $N_{rj}$ is a number of turns on the jth receiver, the $L_{ij}$ is a separation between the ith transmitter and the jth receiver. The summation is carried out over each transmitter-receiver pair in the coil array. In actual practice this formula should be modified to account for the finite size of coils in the actual tool, but for comparison of the relative merits of coil arrays, the point coil formula is sufficient. For the SY coil array, the condition for mutual balance is given by the equation:

$$\frac{N_{rm}}{D^3} - \frac{N_{rb}}{(D-d)^3} - \frac{N_{rb}}{(D+d)^3} = 0$$

where $N_{rm}$ is the number of turns of the main receiver, $N_{rb}$ is the absolute number of turns on the bucking receivers, D is the distance of either of the transmitters to the main receiver, and d is the distance of either of the bucking receivers 52 or 54 to the main receiver 50 as shown in FIG. 2. By setting "t" equal to the turns ratio $N_{rm}/N_{rb}$ (the number of main receiver turns to bucking receiver turns) and setting "s" equal to the spacing ratio D/d (the transmitter spacing to the bucking receiver spacing) the condition for mutual balance can be expressed in the following equation:

$$t = \frac{1}{(1-s)^3} + \frac{1}{(1+s)^3}$$

This equation is all that is necessary to completely specify a mutually balanced SY type coil array assuming point dipole coils. The remainder of this discussion will address mutually balanced SY type coil arrays but it should be understood by those skilled in the art that mutual balance is not a characteristic of SY type coil arrays. It is easier, in practice, to construct a mutually balanced coil array.

The response of SY type coil arrays to various types of geological formations will now be discussed.

A wide class of physical formations are cylindrically symmetric. In such formations, eddy currents induced by the transmitter coils of an induction tool are all parallel and coaxial with the axis of the tool. In such formations, the conductivity of the earth through which the current loop passes is constant. If the conductivity of such a formation is sufficiently low, the eddy current loops in the formation do not interact. In such formations, there is no significant skin effect. The geometric factor theory applicable to such formations is disclosed in the article "Introduction to Induction Logging and Application to Logging of Wells Drilled with Oil Base Mud", *Journal of Petroleum Technology*, Vol. 1, No. 6 (June, 1949), pp. 148-162, authored by H.G. Doll.

According to geometric factor theory the apparent conductivity seen by an induction tool due to one loop of formation of negligible cross-section coaxial with the tool is the conductivity of the loop times a "geometric factor" that depends solely on the geometry of the loop and the tool. The response of the tool to a formation composed of resistive loops of formation can thus be expressed as the integral over all space of the conductivity times this geometric factor. The three dimensional plot of the geometric factor versus depth and radius for a particular tool is referred to as the "map" of that tool.

In formations in which the conductivity is constant in one dimension, different slices of the map may be integrated. If the formation is not invaded, i.e. the effects of the borehole may be neglected, conductivity varies only with depth, and the vertical geometric factor is useful. The value of the vertical geometric factor may be obtained at a given depth by taking a slice of the map at that given depth and integrating it over all radii. This vertical geometric factor provides a means for quantifying the vertical resolution of a coil array. The vertical resolution is the width at half the maximum height of the vertical geometric factor.

The radial geometric factor is useful in thick, invaded beds. Value of the geometrical factor can be obtained at a given radius by taking a slice of the tool map at the given radius and integrating it over all depths. The radial geometric factor is useful in thick beds where conductivity varies continually with the radius.

In thick beds composed of discrete cylindrical zones, the integrated radial geometric factor is more useful. The integrated radial geometric factor at a particular radius is obtained by integrating the radial geometric factor from zero to the given radius. The integrated radial geometric factor quantifies the depth of investigation of a coil array. Traditionally, the depth of investigation is the 50% point of the integrated radial geometric factor.

The integrated radial geometric factor also provides a method for evaluating the borehole effect of an induction tool. The plot of the integrated radial geometric factor on an expanded scale in the borehole region discloses what is termed the borehole geometric factor. The two coil sonde has a very poor borehole effect.

To gain an understanding of how each coil of an SY type coil array affects the tools spatial response, the variation of each of these geometric factors with variations in coil spacing has been evaluated.

From the investigation of the geometric factors, it was found that the width of the central peak of the vertical geometric factor curves changes considerably when the bucking coil spacing is varied and the spacing between the transmitter and receiver is held constant. However, the integrated radial geometric factor for the bucking coil spacing variation is approximately the same. It was also found that the maximum usable borehole diameter is improved by utilizing a small bucking coil spacing. By changing the bucking coil spacing, the vertical response of the tool may be changed to a great extent while making relatively minor changes in the radial response. However, the borehole effect decreases with decreasing bucking coil spacing since more of the signal near the sonde is cancelled out if the bucking coils are nearer to the main coil.

Fixing the bucking coil spacing and varying the location of the transmitter coils relative to the receiver coils while adjusting the number of turns of the bucking coil to zero the mutual inductance results in the finding that the central peak of the vertical geometric factors is the same for each of the different transmitter/receiver spacings. However, the depth of investigation is approximately proportional to the spacing between the transmitter and receiver coils. Also, the maximum usable borehole size is nearly proportional to this spacing.

Therefore, in the symmetrical spaced induction tool of the present invention, the bucking coil spacing determines vertical resolution and the transmitter and receiver coil spacing determines the depth of investigation. In other words, the larger the transmitter and receiver coil spacing and the smaller the bucking coil spacing, the smaller the borehole effect. The larger the transmitter and receiver coil spacing, the deeper the radial response will be, and the smaller the bucking coil spacing the sharper the vertical response will be. This result is quite different and unexpected when compared with conventional coil arrays in which the spacing of the transmitter and receiver coils determines both the vertical resolution and the depth of investigation. From this analysis, the SY type coil array with the best response is one with the largest transmitter and receiver coil spacing and the smallest bucking coil spacing that sensitivity and mechanical considerations will allow. Therefore, those skilled in the art will appreciate that the advantage of the SY coil array is that the vertical and radial focusing are controlled by separate spacings in the array and, because of this, it is possible to control the vertical focusing without destroying the radial focusing and vice versa.

Another unique feature of the SY type array is that the width of the main beam of the vertical geometric factor is the distance between the two bucking coils. This distance between the two bucking coils determines the vertical resolution of the array and in the depicted embodiment of the present invention this distance may be as small as fourteen inches. This is quite different from known conventional arrays in which the main transmitter and receiver coil spacing fixes both the vertical resolution and the depth of investigation. Therefore, by a proper adjustment of this SY type array, the array can be configured such that it has a vertical resolution smaller than the resolution of any other transmitter and receiver coil pairs that make up this array.

FIG. 4 illustrates schematically the preferred processing which may be used in the computer 32 to determine an output conductivity value $\sigma_{out}$. It will be appreciated that this Figure illustrates processing steps and does not show actual hardware structure within the computer 32. Of course, it is within the skill of the art to implement the processing steps in either hardware or software.

Briefly, the R and X value of the signals sent uphole on lines 60 and 62 to the computer 32 are provided to processing step 321 which calculates a measured conductivity value $\sigma_m$ in a conventional manner. A conventional skin effect correction may then be applied to the measured conductivity value $\sigma_m$ to obtain an apparent conductivity value $\sigma_a$.

In making measurements with an induction logging tool, a complex function maps the formation conductivity into the signals detected by the receiver coils. The measured conductivity $\sigma_m$, and thus the apparent conductivity $\sigma_a$, is subject to various non-linear influences caused by induced eddy currents in the formation and other environmental effects. For example, the induced eddy currents themselves act as transmitters which affect the signals detected at the receiver coils and may induce further eddy currents in the formation. Although skin effect corrections reduce the impact of some of these effects, the apparent conductivity $\sigma_a$ is only an approximation of the true formation conductivity $\sigma_t$.

In order to provide a better estimate of the true formation conductivity $\sigma_t$, the apparent conductivity $\sigma_a$ is provided to processing step 323 and to processing step 325. Processing step 323 applies the well-known Doll geometrical factor model $G_D$ and processing step 325 applies a high order fast forward model F. Typically, these models are implemented as filters. Briefly, the models attempt to approximate the complex function which maps the true formation conductivity $\sigma_t$ into the tool response. Stated mathematically, $\sigma_{mD} \approx G_D(\sigma_t)$ where $G_D$ is the Doll response. More generally, it can be stated that $\sigma_m = F_{fm}(\sigma_t)$ where Ffm is the function which maps the true formation conductivity into the measured response.

The Doll model used in processing step 323 is a first order function which, for example, does not account for the portion of signals detected as a result of non-linear interaction of the eddy currents induced in the formation. The higher order model used in processing step 325, however, is intended to account for at least a portion of such non-linear effects on the measured response. Thus, an approximate measure of the degree of non-linearity of the tool response may be expressed as $G_D(\sigma_a) - F(\sigma_a)$.

If it is assumed that the degree of non-linearity induced by the tool on the apparent conductivity $\sigma_a$ is the same as the difference of the Doll model and the higher order model applied to the true formation conductivity $\sigma_t$, it may be asserted that $$G_D(\sigma_t) - F(\sigma_t) = G_D(\sigma_a) - F(\sigma_a) \tag{1}$$

Since $F(\sigma_t)$ corresponds generally to the measured conductivity $\sigma_m$, the only unknown in equation (1) is $G_D(\sigma_t)$. Equation 1 may be rewritten as $$G_d(\sigma_t) = G_D(\sigma_a) - F(\sigma_a) + F(\sigma_t) \tag{2a}$$

and $$G_D(\sigma_t) = G_D(\sigma_a) - F(\sigma_a) + \sigma_m \tag{2b}$$

The Doll response is easily inverted, thus by inverting the right-hand side of equation (2b), one obtains $$\sigma_t \approx G_D^{-1}[G_D(\sigma_a) + \sigma_m - F(\sigma_a)] \tag{3a}$$

and $$\sigma_t \approx \sigma_a + G_D^{-1}[\sigma_m - F(\sigma_a)] \tag{3b}$$

Since the value of $\sigma_t$ obtained with equation (3b) is an approximation, in the following discussion this value will be designated $\tilde{\sigma}_t$.

Referring again to FIG. 4, processing step 327 performs the calculation of equation (3b) to obtain an initial value $\tilde{\sigma}_t$ for the true formation conductivity. Since equation (3b) does not require a value for $G_D(\sigma_a)$, processing step 323 may be omitted. This initial value $\tilde{\sigma}_t$ is then provided to processing step 329 wherein an iterative process is used to obtain a more refined value for $\tilde{\sigma}_t$.

Figure 5:
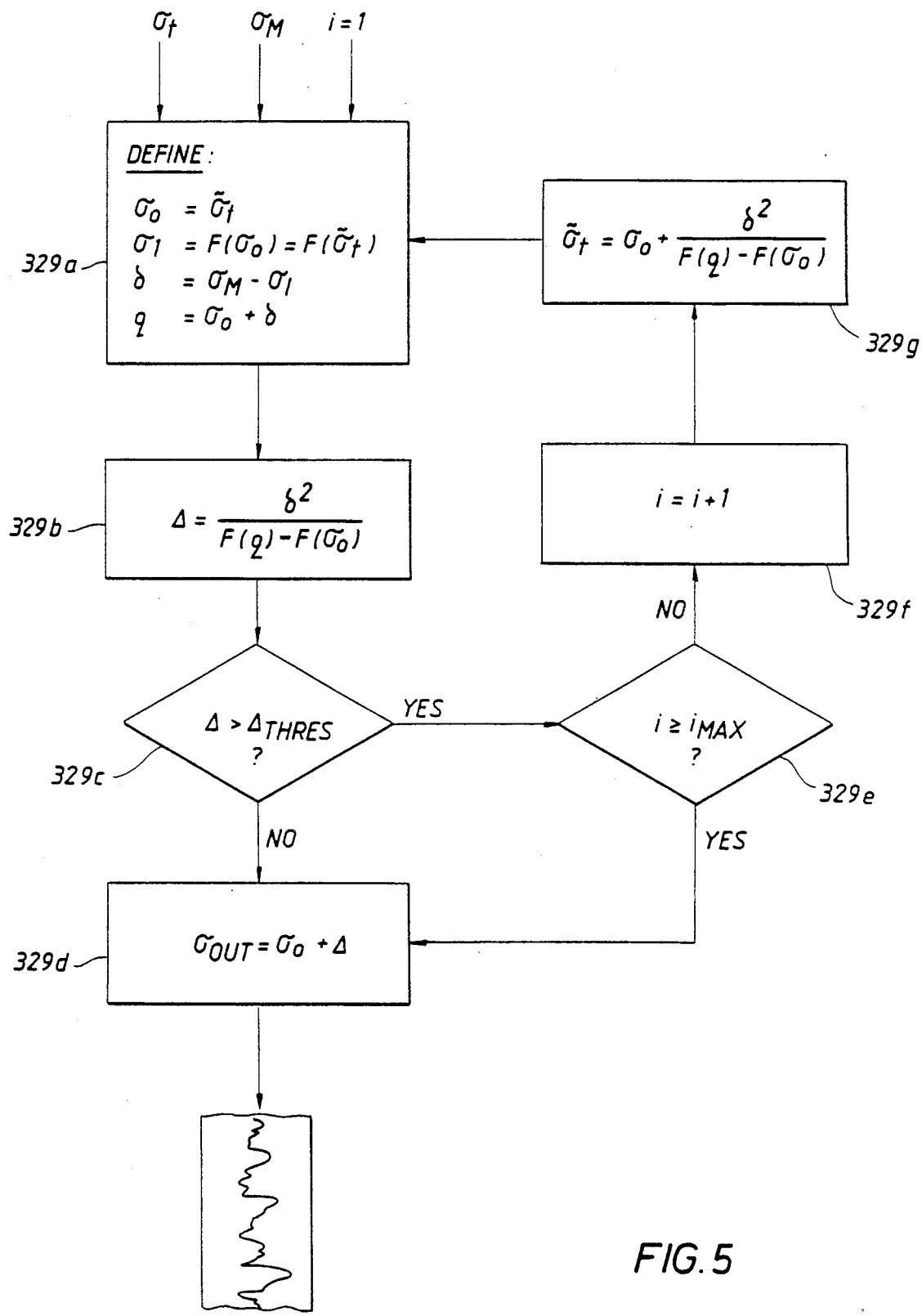
FIG. 5 is a process flow diagram illustrating an iterative processing technique which may be utilized in the processing mode illustrated in FIG. 4.

The preferred iterative technique of processing step 329 is illustrated in FIG. 5. The step 329 receives as inputs the values $\tilde{\sigma}_t$ from processing step 327 and $\sigma_m$ from processing step 321. Additionally, a local integer counter i may be set equal to 1. Step 329(a) defines additional local variables. Specifically, a value $\sigma_o$ is set equal to the current value of $\tilde{\sigma}_t$; a value $\sigma_l$ is set equal to $F(\sigma_o)$; an error value $\delta$ is set equal to $\sigma_m - \sigma_l$; and a value q is set equal to $\sigma_o + \delta$.

By applying the high order model F to the value q, one obtains $$F(q) = F(\sigma_o + \delta) \tag{4a}$$

The right-hand side of equation (4a) may then be expanded in a Taylor's series to yield $$F(q) = F(\sigma_o) + \delta F'(\sigma_o) \tag{4b}$$

wherein only the first two terms of the Taylor's series are expressed.

Since the initial conductivity value $\tilde{\sigma}_t$ is an approximation, the true formation conductivity $\sigma_t$ is equal to $\tilde{\sigma}_t$ plus an error value. This may be expressed in equation form as $$\sigma_t = \tilde{\sigma}_t + \Delta = \sigma_o + \Delta \quad (6a)$$

and, by two-term Taylor's series expansion $$\sigma_m = F(\sigma_o) + \Delta F'(\sigma_o) \quad (6b)$$

Equation (4b) can be rewritten as $$\delta F'(\sigma_o) = F(q) - F(\sigma_o) \quad (4c)$$

and equation (6b) can be rewritten as $$\Delta F'(\sigma_o) = \sigma_m - F(\sigma_o) \quad (6c)$$

By taking the ratio of equation (6c) to equation (4c), one obtains $$\frac{\Delta F'(\sigma_o)}{\delta F'(\sigma_o)} = \frac{\sigma_m - F(\sigma_o)}{F(q) - F(\sigma_o)} \quad (7)$$

Solving for $\Delta$, $$\Delta = \delta \frac{\sigma_m - F(\sigma_o)}{F(q) - F(\sigma_o)} = \frac{\delta(\sigma_m - \sigma_1)}{F(q) - \sigma_1}, \quad (8a)$$

and substituting $\delta = \sigma_m - \sigma_1$ $$\Delta = \frac{\delta^2}{F(q) - \sigma_1}. \quad (8b)$$

Equation 8b is computed in process step 329(b) to calculate error value $\Delta$.

Process step 329(c) compares the calculated error value with a threshold error value $\Delta_t$. If the calculated error value is smaller than the threshold error value $\Delta_t$, then process step 329(d) assigns output formation conductivity $\sigma_{out}$ to be equal to $\sigma_o + \Delta$. Otherwise, control passes to processing step 329(e) which compares iteration counter i to a predetermined maximum iteration count $i_{max}$. If the iteration counter i is less than the maximum iteration count $i_{max}$, then the iteration counter i is incremented in processing step 329(f) and $\tilde{\sigma}_t$ is set equal to $\sigma_o + \Delta$. If, on the other hand, the maximum number of iterations has occurred, control goes from processing step 329(e) to processing step 329(d) wherein a value is assigned to the output conductivity $\sigma_{out}$.

Various models are known which may be used for the function $F(\sigma)$. Such models include, for example, a complex set of Maxwell's equations which, for purposes of real time processing in a well logging environment, are impractical to solve. Thus, a model better suited to real time well logging is needed.

In cylindrical geometry, the vector potential due to a infinitesimal magnetic dipole satisfies the equation:

$$\nabla^2 A_\phi + k^2 A_\phi = -\mu J_\phi \quad (9)$$

where $\mu$ is the magnetic permeability, $k^2 = jw\mu(\sigma - jw\epsilon_0\epsilon_r)$, $\epsilon_0$ is the freespace dielectric constant, $\epsilon_r$ is the relative dielectric constant, $\sigma$ is the conductivity and $J_\phi$ is the dipole loop current. When $\sigma$ or $\epsilon_r$ are functions of $(\rho, z)$ the solution to equation (9) cannot be put in a closed form. However, letting $$k^2 = k_0^2 + \beta^2$$

where $k_0^2 = jw\mu\sigma_0$ is a constant and $\beta^2$ is a function of $(\rho, z)$, equation (9) can be written as $$\nabla^2 A_\phi + k_0^2 A_\phi = -\mu J - \beta^2 A_\phi \quad (10)$$

The symbol $\sigma_0$ for homogeneous medium is chosen for convenience and has no direct relationship to the use of the same symbol prior to equation (9). Now, consider the solution to following system of wave equations:

$$\nabla^2 A_\phi^{(0)} + k_0^2 A_\phi^{(0)} = -\mu J \quad (11a)$$

$$\nabla^2 A_\phi^{(n)} + k_0^2 A_\phi^{(n)} = -\beta^2 A_\phi^{(n-1)} \quad (11b)$$

for $n = 1, 2, \ldots$ Then, the sum $$A_\phi = \sum_{n=0}^{\infty} A_\phi^{(n)}$$

satisfies equation (10). The solution to equations (11a) and 11(b) are $$A_\phi^{(0)}(\rho, z) = \frac{Q}{2\pi} \int_0^{2\pi} \frac{e^{jk_0 \hat{R}_0}}{\hat{R}_0} \cos(\phi_0) d\phi_0 \quad (12a)$$

$$A_\phi^{(n)}(\rho, z) = \frac{1}{4\pi} \int_{-\infty}^{\infty} \int_0^{\infty} \rho_n d\rho_n dz_n \beta^2(\rho_n, z_n) A_\phi^{(n-1)}(\rho_n, z_n) \int_0^{2\pi} \frac{e^{jk_0 \hat{R}_n}}{\hat{R}_n} \cos(\phi_n) d\phi_n \quad (12b)$$

where $$Q = \frac{\mu I N \rho_T}{2}$$

$$\hat{R}_0^2(\rho, z) = \rho^2 + \rho_T^2 - 2\rho\rho_T \cos(\phi_0) + (z - z_T)^2$$

$$\hat{R}_n^2(\rho, z) = \rho^2 + \rho_n^2 - 2\rho\rho_n \cos(\phi_n) + (z - z_n)^2$$

For a small transmitter dipole, it can be assumed that $\rho T$ is small and $z_T = 0$, and then equation (12a) becomes $$A_\phi^{(0)}(\rho, z) = \frac{Q\rho_T\rho}{2R_0^3} (1 - jk_0 R_0) e^{jk_0 R_0} \quad (13)$$

where $R_0 = \sqrt{\rho^2 + \rho^2}$. For a small receiver located at $z_1 = L$ and radius $\rho_R \to 0$, $A_\phi^{(1)}$ can be simplified as:

$$A_\phi^{(1)}(\rho_R, L) = \quad (14)$$

$$\frac{1}{4\pi} \int_{-\infty}^{\infty} \int_0^{\infty} \rho_1 d\rho_1 dz_1 \beta^2(\rho_1, z_1) A_\phi^{(0)}(\rho_1, z_1) \frac{\rho_R \rho_1}{R_1^3} (1 - jk_0 R_1) e^{jk_0 R_1} =$$

-continued $$\frac{Q\rho_T\rho_R}{L}\int_{-\infty}^{\infty}\int_0^{\infty} d\rho_1 dz_1 \beta^2(\rho_1, z_1) G_D(\rho_1, z_1)(1 - jk_0R_0)(1 - jk_0R_1)e^{jk_0(R_0+R_1)}$$

where $R_1 = \sqrt{\rho_R^2 + (z-L)^2}$ and $G_D(\rho, z) = \frac{L\rho^3}{2R_0^3R_1^3}$.

The vector potential at the receiver is approximated by $$A_\phi = \frac{Q\rho_T\rho_R}{2L^3}(1 - jk_0L)e^{jk_0L} + \tag{15}$$

$$\frac{Q\rho_T\rho_R}{4L}\int_{-\infty}^{\infty}\int_0^{\infty} d\rho_1 dz_1 \beta^2(\rho_1, z_1) G_1(\rho_1, z_1)$$

The above expression represents a primary homogeneous term with a first order pertubation. The expression $$G_1(\rho_1, z_1) = G_D(\rho_1, z_1)(1-jk_0R_0)(1-jk_0R_1)e^{jk_0(R_0+R_1)}.$$

represents a propagated geometric factor which has the advantage of being symmetric (a sufficient but not necessary condition for reciprocity). Physically, the expression represents the effect of wave propagation from the transmitter to a ground loop through otherwise homogeneous medium followed by propagation from the ground loop to the receiver through the same medium.

One can go one step forward and add a second order pertubation to the vector potential expression in equation (15). The corresponding geometric factor is $$G_2 = \frac{\rho_1^2\rho_2^2}{R_0^3R_2^3} e^{jk_0(R_0+R_2)} \int_0^{2\pi} \frac{e^{jk_0\hat{R}_1}}{\hat{R}_1} \cos(\phi_1) d\phi_1$$

where $R_1$ is evaluated at $(\rho_2, z_2)$. The integral in the above expression involves radii $\rho_1$ and $\rho_2$, which are not small and hence, the approximation used in equations (13) and (14) cannot be used here.

Fortunately, for a horizontally stratified media with no radial variations, it is possible to derive higher order vertical geometric factors even though the corresponding 2-dimensional geometric factors cannot be expressed in closed forms. For this, the expressions for vector potential in equations (12a) and (12b) are used. From the tables of integrals $$\int_0^{2\pi} \frac{e^{jk_0R_n}}{R_n} \cos(\phi_n)d\phi_n = 2\pi \int_0^{\infty} \frac{\lambda}{\psi} e^{-\psi|z-z_n|} J_1(\lambda\rho)J_1(\lambda\rho_n)d\lambda \tag{16}$$

where $\psi = \sqrt{\lambda^2 - k_0^2}$. Using equation 16, equations (12a) and 12(b) can be rewritten as $$A_\phi^{(0)} = Q\int_0^{\infty} \frac{\lambda_0}{\psi_0} e^{-\psi|z-z_T|} J_1(\lambda_0\rho)J_1(\lambda_0\rho_T)d\lambda_0 \tag{17a}$$

$$A_\phi^{(n)} = \frac{1}{2}\int_{-\infty}^{\infty} dz_n \int_0^{\infty} d\rho_n \beta^2(\rho_n, z_n) A_\phi^{(n-1)}(\rho_n, z_n) \int_0^{\infty} \frac{\lambda_n}{\psi_n} e^{-\psi_n|z-z_n|} J_1(\lambda_n\rho)J_1(\lambda_n\rho_n)d\lambda_n. \tag{17b}$$

Now assuming that the formation is strictly layered i.e. $\beta^2(\rho, z) = \beta^2(z)$, substitution of equation (17a) in equation (17b) for $n=1$ and integration over $\rho_1$ yields $$A_\phi^{(1)} = \frac{Q}{2}\int_{-\infty}^{\infty} \beta^2(z_1)dz_1 \int_0^{\infty} d\lambda_1 \int_0^{\infty} d\lambda_2 e^{-\psi_n|z_1-z_T|-\psi_1|z-z_1|} \tag{18}$$

where the orthogonality property of Bessel function $J_1$ has been used. Similar expressions for $A_\phi^{(2)}$, $A_\phi^{(3)}$ ect. can be derived. The general expression is $$A_\phi^{(n)} = \frac{Q}{2^n}\int_{-\infty}^{\infty} \beta^2(z_1)dz_1 \int_{-\infty}^{\infty} \beta^2(z_2)dz_2 \ldots \tag{19}$$

$$\int_{-\infty}^{\infty} \beta^2(z_n)dz_n \int_0^{\infty} \frac{\lambda}{\psi^{n+1}} e^{-\psi \hat{z}_n} J_1(\lambda\rho)J_1(\lambda\rho_T)d\lambda$$

where $\hat{z}_n = \sum_{k=0}^{n} |z_{k+1} - z_k|$, $z_0 = z_T$ and $z_{n+1} = z$.

In particular, when equation 19 is evaluated at the receiver, $=\rho_R$ and $z=z_R=L$. Letting $\rho_R$ and $\rho_T$ tend to zero and using small argument expansion for $J_1$ $$A_\phi^{(0)} = \frac{Q\rho_R\rho_T}{2L^3}(1 - jk_0L) e^{jk_0L} \tag{20a}$$

$$A_\phi^{(n)} = \frac{Q\rho_R\rho_T}{2^{n+2}}\int_{-\infty}^{\infty} \beta^2(z_1)dz_1 \ldots \tag{20b}$$

$$\int_{-\infty}^{\infty} \beta^2(z_n)dz_n(F_{n-2}(jk_0\hat{z}_n) + (k_0\hat{z}_n)^2 F_n(jk_0\hat{z}_n))\hat{z}_n^{n-3}$$

where $F_n(v)\int_{-v}^{\infty} \frac{e^{-z}}{x^n} dx$ and $Re(v) < 0$. Then, the vector potential is $$A_\phi = \sum_0^{\infty} A_\phi^{(n)}. \tag{21}$$

For a homogeneous medium of conductivity $\sigma$ different from $\sigma_0$ the above sum converges if $|\sigma - \sigma_0| \leq \sigma_0$.

Several features of equation (20b) are noteworthy. The expression represents the interaction of n arbitrarily placed layers in sequence, each layer being excited by the currents in the previous layer. It is a function of $Z_n$, which is the absolute length of the path that the signal took while traversing n layers of the formation from the transmitter to the receiver Finally, , $A_\phi^{(n)}$, $n=2, 3$. can be considered as correction to $A_\phi^{(0)} + A_\phi^{(1)}$. In particular, the terms for $n \geq 4$, may be ignored, then $$A_\phi = A_\phi^{(0)} + A_{\phi(1)} + A_\phi^{(2)} + A_{\phi(3)} \tag{22}$$

The second term in the above expression represents the contribution due to perturbation of the homogeneous medium and the third a correction due to the interaction between two layers and so forth. Previous research indicates that the first three terms used in equation (21)

are sufficient for modeling the response of an induction tool. However, in presence of highly conductive layers all four terms may be necessary.

The expressions in equations (20a) and (20b) can be converted to conductivity units by dividing with the tool constant $$\frac{Q_\rho R_\rho T^{k02}}{4L\sigma_0} \text{ which gives}$$

$$\sigma^{(0)} = \frac{-2\sigma_0}{(-jk_0L)^2}(1 - jk_0L)e^{jk_0L} \quad (23a)$$

$$\sigma^{(n)} = \frac{\sigma_0 L}{2^n k_0^2} \int_{-\infty}^{\infty} \beta^2(z_1)dz_1 \ldots \quad (23b)$$

$$\int_{-\infty}^{\infty} \beta^2(z_n)dz_n(F_{n-2}(jk_0\hat{z}_n) + (k_0\hat{z}_n)^2 F_n(jk_0\hat{z}_n))\hat{z}_n^{n-3} =$$

$$\int_{-\infty}^{\infty}(\sigma(z_1) - \sigma_0)dz_1 \ldots \int_{-\infty}^{\infty}(\sigma(z_n) - \sigma_0)dz_n g_n(z_1, \ldots, z_n)$$

where $g_n$ is an n-dimensional propagated geometrical factor defined as $$g_n(z_1, \ldots, z_n) = \frac{L(j\omega\mu)^{n-1}}{2^n}(F_{n-2}(jk_0\hat{z}_n) + (k_0\hat{z}_n)^2 F_n(jk_0\hat{z}_n))\hat{z}_n^{n-3}$$

The apparent conductivity $\sigma_a$ is $$\sigma_n = \sum_{0}^{\infty} \sigma^{(n)}$$

The above sum converges subject to the same constraints as equation (21).

The expression in equation (23b) for n=1 is a simple convolution, however, for $n \geq 2$ we have higher dimensional convolutions which would require a significant amount of time for evaluation. It becomes essential to approximate the convolutions for $n \geq 2$ in such a way that they can be evaluated fast yet accurately. Consider equation (19), for n=2, with $\rho_T$ and $\rho$ small, $z_0 = z_T$ the transmitter location and $z_3 = z_R$ the receiver location, $$g_2(z_1, z_2) = \frac{j\omega\mu L}{4} \int_0^{\infty} \frac{\lambda^3}{\psi^3} e^{-\psi(|z_T-z_1|+|z_1-z_2|+|z_2-z_R|)} d\lambda \quad (24)$$

which can be rewritten as $$g_2(z_1, z_2) = \frac{j\omega\mu L}{4} \int_0^{\infty} \frac{\lambda^3}{\psi^3} e^{-\psi(|z_T-z_1|+|z_1-z_R|)} e^{-\psi(|z_1-z_2|+|z_2-z_R|-|z_1-z_R|)} d\lambda.$$

According to the Triangular inequality $|z_1-z_2| \geq ||z_2-z_R| - |z_1-z_R||$. For $z_R$ small the right-hand side of the inequality is of the same order as the left-hand side if $z_1$ and $z_2$ are of the same sign. In reality, $z_1$ and $z_2$ may not be of the same sign. Nevertheless, we proceed by replacing $||z_2-z_R|-|z_1-z_R||$ by $|z_1-z_2|$. Equation (24) now becomes $$h_2(z_1, z_2) = \quad (25)$$

$$\frac{j\omega\mu L}{4} \int_0^{\infty} \frac{\lambda^3}{\psi^3} e^{-\psi(|z_T-z_1|+|z_1-z_R|)} e^{-\psi(2|z_1-z_2|)} d\lambda$$

where to distinguish equation (24) from equation (25) $g_2$ has been replaced by $h_2$. Further, it is assumed that the modified second exponential term varies slowly with respect to $\lambda$ as compared with the rest of the integrand. Using arguments similar to those used for the steepest descent technique, equation (25) becomes $$h_2(z_1, z_2) = \frac{j\omega\mu L}{4} e^{2jk_0|z_1-z_2|} \int_0^{\infty} \frac{\lambda^3}{\psi^3} e^{-\psi(|z_T-z_1|+|z_1-z_R|)} d\lambda \quad (26)$$

To ensure that the above expression gives the same value as does equation (24) in a homogeneous formation it is multiplied by a factor $$X_2 = \frac{\int_{-\infty}^{\infty} dz_1 \int_{-\infty}^{\infty} dz_2 g_2(z_1, z_2)}{\int_{-\infty}^{\infty} dz_1 \int_{-\infty}^{\infty} dz_2 h_2(z_1, z_2)}$$

The second order contribution to conductivity is $$\sigma^{(2)} = \quad (27)$$

$$\int_{-\infty}^{\infty} dz_1 \gamma_2(z_1)(\sigma(z_1) - \sigma_0) \int_{-\infty}^{\infty} dz_2(\sigma(z_2) - \sigma_0)g_p(|z_1-z_2|)$$

where $$\gamma_2(z) = X_2 \frac{j\omega\mu L}{4} \int_0^{\infty} \frac{\lambda^3}{\psi^3} e^{-\psi(|z_T-z|+|z-z_R|)} d\lambda =$$

$$\frac{X_2 L(j\omega\mu)}{4\hat{z}}(F_0(jk_0\hat{z}) - (k_0\hat{z})^2 F_2(jk_0\hat{z}))$$

with $\hat{z} = |z_T-z| + |z-z_R|$ and $$g_p(z) = e^{2jk_0|z|}$$

Figure 6:
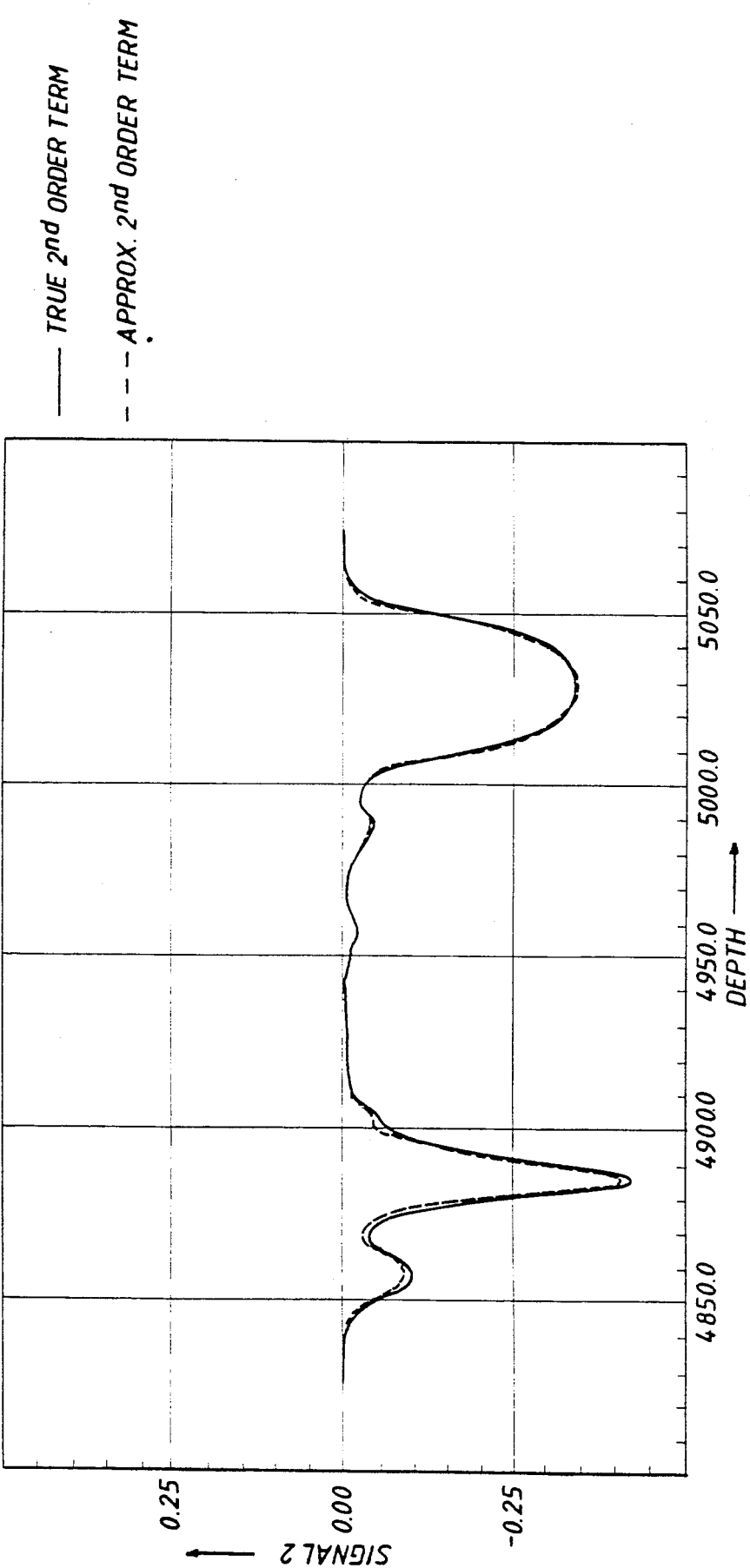
FIG. 6 illustrates comparative results of processing with two different formation models.

Equation (27) is a product of two one-dimensional convolutions, with the computational complexity of order O(2N) instead of O(N²) for a two-dimensional convolution. A comparison between $\sigma^{(2)}$ obtained by using $g_2(z_1, z_2)$ and $h_2(z_1, z_2)$ is shown in FIG. 6. These are the 2nd-order responses of the conventional deep induction tool to the Oklahoma Formation. The two results are remarkably close.

It is interesting to give a physical interpretation to equation (27). The integral with $g_p$ term represents the attenuation and a phase shift suffered by a plane wave as it traverses conductivity purtubations of a homogeneous formation from a point $z_1$ to $z_2$ and back. In a sense it modifies the conductivity at $z_1$, to include the second order effects, which then is convolved with another geometric factor to account for the effects of the adjoining regions. Higher order geometric factors can be similarly modified to give $$\hat{g}_n(z_1, \ldots, z_n) = \gamma_n(z_1) g_p(|z_1 - z_2|) \ldots g_p(|z_n - z_{n+1}|)$$

where $g_p$ has been defined earlier and $$\gamma_n(z) = X_n \frac{(j\omega\mu)^{n-1} L}{2^n} \int_0^\infty \frac{\lambda^3}{\psi^{n+1}} e^{-\psi(|zT-z|+|z-zR|)} d\lambda =$$

$$X_n \frac{L(j\omega\mu)^{n-1}}{2^n} (F_{n-2}(jk_0\hat{z}) + (k_0\hat{z})^2 F_n(jk_0\hat{z}))\hat{z}^{n-3}$$

The foregoing formation response model is intended to provide the most accurate conductivity values given computational constraints associated with real time well logging. Other models may also be applied. Additionally, techniques performed away from the well site may employ powerful main frame computer and, thus, implement relatively complex response models.

Another possible method of determining an improved output conductivity value by correcting for shoulder effects at the surface in the logging truck computer has been disclosed by T.D. Barber in the article "Introduction to the Digital Induction Tool" in the *Transactions of the 58th Annual Technical Conference and Exhibition of the Society of Petroleum Engineers of AIME*, SPE 12049, 1983. Also, U.S. Pat. No. 4,471,436 and U.S. Pat. No. 4,467,425 disclose possible alternative corrections of this shoulder effect. These references disclose a method termed "Phasor Processing" which uses both the components of the receiver voltage that are in-phase and out-of-phase with the current in the transmitter. These two components are referred to as R and X (signal lines 60 and 61 of FIG. 2). U.S. Pat. No. 4,455,529 discloses one method of measuring the R and X signals. The R and X signals are each filtered with their own spatial averaging filters. The spatial averaging filters may be applied in a manner disclosed in U.S. Pat. No. 3,166,709. The filtered conductivity signal at a particular depth is obtained by taking a weighted average of the readings surrounding the depth of interest. The weights in the filter for the R signal are chosen to correct for the shoulder effect in resistive formations (in the limit of no skin effect). The X signal weights are chosen to match the X signal to the error in the filtered R signal caused by skin effect. The level of the filtered X signal is then corrected so that it matches the level of error in the R signal due to skin effect for a homogeneous formation. This possible correction technique for skin effect is disclosed in U.S. Pat. No. 3,147,429. The filtered and level adjusted X signal is then added to the filtered R signal. The phasor processing algorithm can be summarized by $$\sigma_i = \sum_{j=-n}^{n} a_j \sigma_{Ri+j} + \alpha(\sigma_X) \sum_{j=-n}^{n} b_j \sigma_{Xi+j}$$

where $\sigma_A$ is the corrected log, $\sigma_R$ is the R conductivity signal, $\sigma_X$ is the X conductivity signal, the coefficients $a_j$ are the weights of the R signal spatial averaging filter, the coefficients $b_j$ are the coefficients of the X signal special averaging filter, and $\alpha$ is the skin effect correction function. This phasor processing may be accomplished in the computer 32 of FIG. 1.

Another method to correct for shoulder effect and skin effect would be to operate the induction tool at sufficiently low frequency such that skin effect is not a problem. In this case, the log signal could be corrected for shoulder effect by applying the filter for the R signal as disclosed by U.S. Pat. No. 3,166,709.

The logging system corrects for most of the shoulder effect. Thus, the burden for correcting the shoulder effect does not fall on the placement and relative strength of the coils. The fundamental advantage of SY coil arrays, therefore, is that the depth of investigation, vertical resolution, and shoulder effect are each controlled by different tool design parameters. Since these design parameters are separate and do not interact appreciably, each can be optimized separately without the need for compromise as is the case in known induction tools. Therefore, it is possible to design an SY type array that can resolve thin beds and see deeply into the formation.

There are several other alternative embodiments of the SY type coil arrays that have spatial responses identical to the responses of the design illustrated in FIG. 2. A second implementation which is identical in result to the implementation of FIG. 2 discussed above can be obtained by substituting receiver coils for transmitter coils and vice versa. Additionally, the bucking coils of this embodiment would become transmitter bucking coils as opposed to receiver bucking coils as depicted in FIG. 2. This coil array would be operated in the same manner as the array disclosed in FIG. 2. While the absolute number of turns of the transmitter and the receiver coils might have to be adjusted because of instrumentation considerations, this would not change the tools spatial response. By reciprocity, those skilled in the art will appreciate that this implementation would have the same response as the implementation illustrated in FIG. 2.

A third alternative implementation is illustrated in FIG. 3. In this implementation, there is one transmitter coil 120 and two main receiver coils 124 and 130, with four bucking receiver coils 126, 128, 132 and 134. The main receiver coils 124 and 130 are located symmetrically about the transmitter coil 120 with the bucking receiver coils 126, 128 and 132, 134 symmetrically arranged about the main receivers 120 and 130. Again, the main receiver coils 124 and 130 are spaced by a distance D from the transmitter 120 and the transmitter 120 is located at a selected point in the center portion of the insulated mandrel 112. Also, the bucking receiver coils 126, 128 and 132, 134 are symmetrically positioned at a distance d from their respective main receiver coils 124 and 130 as shown. As can be seen, array 110 is symmetric about the transmitter coil 120. The schematic diagram of FIG. 3 illustrates how the transmitter coil 120 is connected to oscillator circuit 102 and that the two main receiver coils 124 and 130 with their respective bucking receiver coils 126, 128 and 132, 134 are connected to two separate receiver circuits 104 and 106 that combine the recorded signal with the phase reference signal on line 103 produce the in-phase and out-of-phase signals on lines 140, 141, 142 and 143 respectively. In the preferred embodiment, these receiver circuit signals are digitized and then set to the computer 32 (see FIG. 1) at the surface. Since these two receiver coil arrays are at different depths, they will respond to different portions of the formation at different times as the tool moves through the borehole. The in-phase and out-of-phase signals from the upper receiver coil 124 are recorded and delayed in depth by the computer at the surface so that these signals will align with the measurements from the lower receiver coil 130. The spacing between the two receiver coils 124 and 130 is 2D. The depth-shifted measurements from the upper receiver coil 124 is then averaged with the measurement from the lower receiver coil 130. According to the principle of superposition, the averaged measurement is identical to the measurement made by the receiver coil in the first implementation illustrated in FIG. 2. This is because, in the first implementation, the receiver array is symmetrical and so the effects of the transmitter coils can be considered separately. The conditions for mutual balance and the responses are identical to those of the implementation depicted in FIG. 1.

Of course, a fourth implementation could also be derived from the implementation of FIG. 3 by including a single receiver and two main transmitter coils with each main transmitter coil including two bucking transmitter coils. This embodiment is more difficult to implement however, because the two arrays of transmitter coils must be multiplexed in some manner so that the signal depicted by the single receiver due to each of the arrays of transmitters can be measured separately.

These third and fourth implementations of the SY type coil arrays are particular cases of any of several different implementations in which the coil arrays are separated into different combinations consisting of transmitter-receiver pairs. The portion of the signals from each of the constituent coil pair is measured separately, and then all the measurements are combined (after possible depth-shifting) in order to recreate the total SY coil tool response. Therefore, all such implementations should give identical responses to the embodiment illustrated in FIG. 2.

Figure 7:
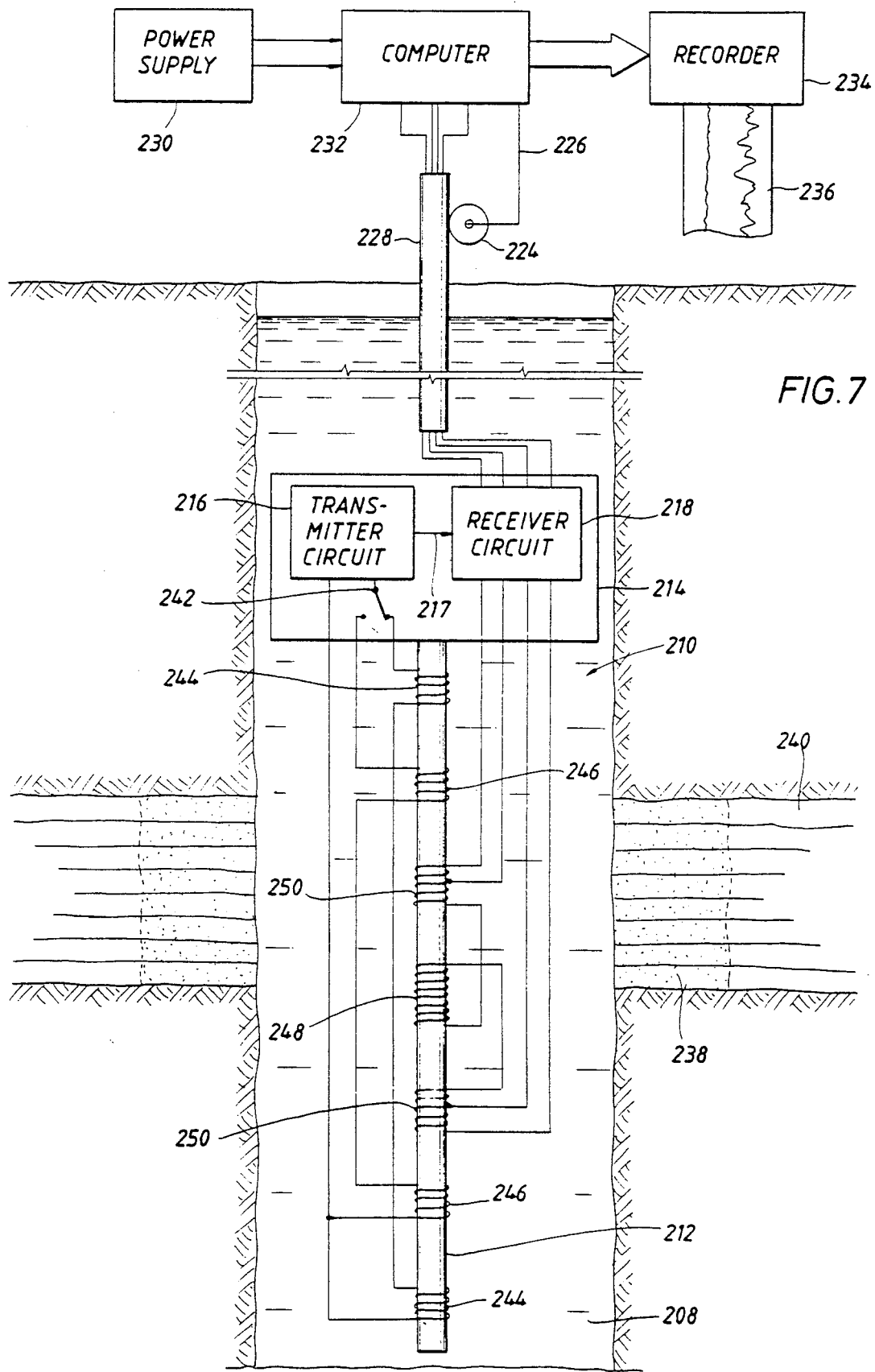
FIG. 7 is a block diagram of one embodiment of a dual high resolution induction tool of the present invention positioned in a borehole.

With reference now to FIG. 7, there is depicted a block diagram of dual high resolution induction tool 210 of another embodiment of the present invention. Those skilled in the art will appreciate that the dimensions of FIG. 7 have been exaggerated for the purposes of illustration. As can be seen, insulated sonde 212 and downhole electronics package 214 are suspended in a borehole 208 by means of a multiconductor logging cable 228. Logging cable 228 is preferably coupled to downhole electronics package 214 and preferably includes both electrical power and signal conductors.

Downhole electronics package 214 includes transmitter 216 and phase sensitive receiver circuit 218. Those skilled in the art will appreciate that transmitter 216 will typically include an oscillator circuit which will provide a phase reference signal to phase sensitive receiver circuit 218 via line 217. Transmitter 216 is alternately coupled via selective control 242 to either transmitter coil pair 244 or transmitter coil pair 246. As those skilled in the art of induction tools will appreciate, an alternating frequency signal generated by transmitter 216 and coupled to transmitter coil pair 244 or transmitter coil pair 246 will inductively produce an electromagnetic field which will cause eddy currents to flow within the formation. These eddy currents produce a secondary magnetic field which will induce a voltage in receiver coil 248. Bucking coils 250 are utilized, in a manner which will be explained in detail herein, to isolate receiver coil 248 from the large mutual signal which might otherwise be coupled from transmitter coil pair 244 or 246.

As will be apparent to those practitioners in this art, the spacing between transmitter coil pairs 244 or 246 and receiver coil 248 will directly effect the depth of investigation demonstrated by dual high resolution induction tool 210. Thus, transmitter coil pair 244 and receiver coil 248 will result in a deeper investigation into the formation than will be experienced with transmitter coil pair 246 and receiver 248. In this manner, bed 240 may be investigated to two different depths of investigation, resulting in measurements of invasion zone 238 and uninvaded zone 239.

The voltages induced in receiver coil 248 are coupled through phase sensitive receiver circuit 218 to computer 232 located at the earth's surface through logging cable 228. These received signals are utilized to provide information concerning the resistivity of the formation surrounding borehole 208. Computer 232 is preferably coupled to a power source 230 which provides electrical power to downhole electronic package 214 through logging cable 228.

A winch 224 is also utilized in conjunction with logging cable 228 to raise and lower dual high resolution induction tool 210 into and out of borehole 208. In a preferred embodiment of the present invention, winch 224 provides a depth signal on line 226 to computer 232 to provide a depth correlation for a log plot. Computer 232 receives the output of receiver coil 248 and is utilized to provide shoulder and skin effect correction computations as discussed above or in any other manner well known in the art to compute a corrected log signal which is then coupled to recorder 234. In the depicted embodiment of the present invention, recorder 234 preferably produces a well log 236 which depicts the corrected log signal versus depth of the tool in borehole 208.

Figure 9:
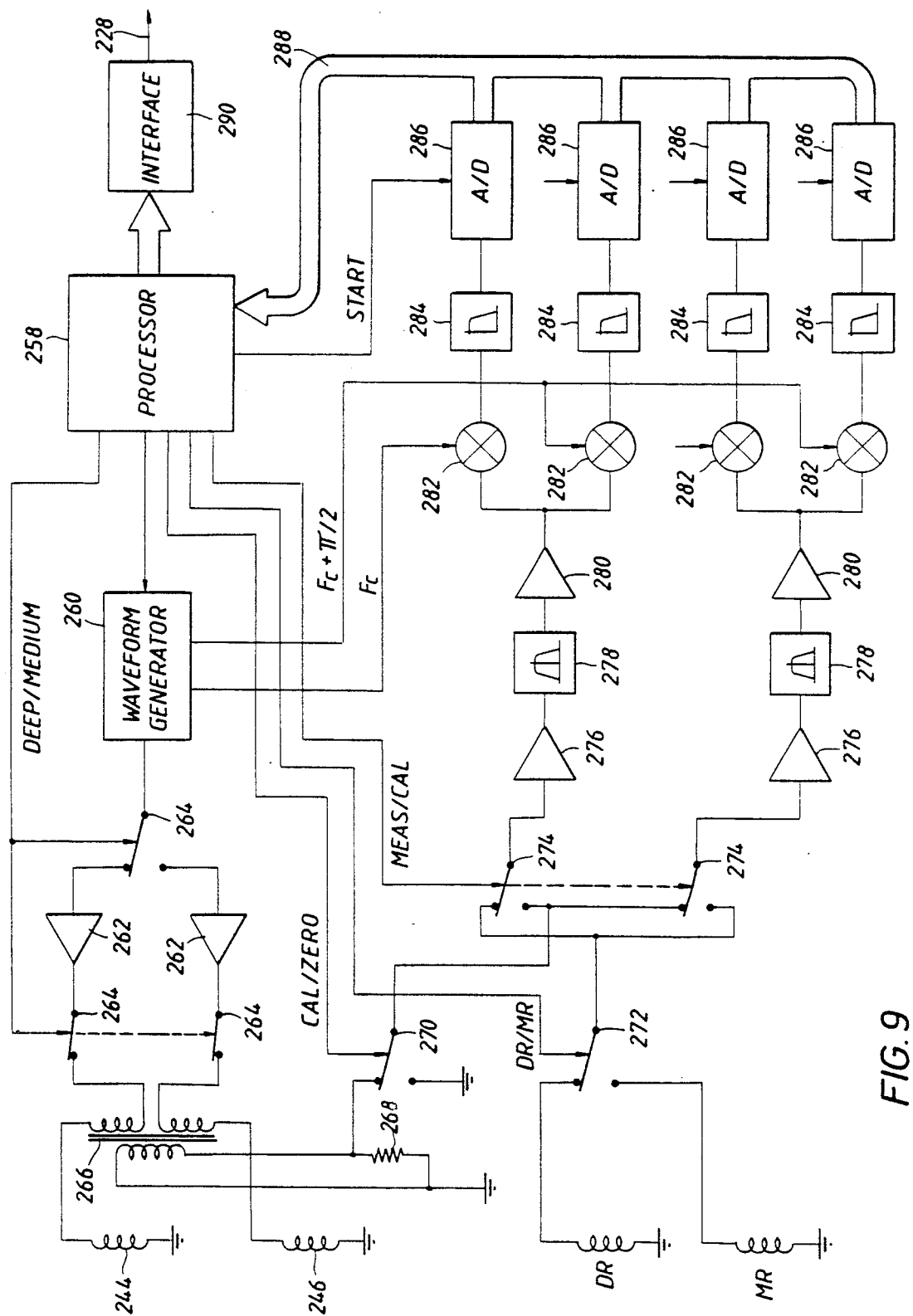
FIG. 9 is a simplified schematic diagram of one embodiment of the dual high resolution induction tool of the present invention.

FIGS. 8 and 9 together illustrate one preferred embodiment of the present invention. Two pair of transmitter coils 244 and 246 are preferably disposed symmetrically about a selected point on an insulated sonde 212. Each of the transmitter coils includes $N_t$ turns that are wound in the same sense. A main receiver coil 248 with $N_{rm}$ turns is located at a selected point on insulated sonde 212. Also located on mandrel 212 and disposed symmetrically about receiver coil 248 are two bucking receiver coils 250, each consisting of $N_{rb}$ turns with a tap located in each bucking coil 250. These bucking coils are wound in series with receiver coil 248 and are wound in opposite sense to receiver coil 248. Bucking coils 250 are so named because their purpose to buck-out the large mutual coupling from transmitter coil pair 244 and transmitter coil pair 246 and to cancel any signals coming from that portion of the formation nearest the coil array. Bucking coils 250 are each spaced from the main receiver coil 248 by a selected distance, which, as discussed above, will control the vertical resolution of dual high resolution induction tool 210. Unlike known bucking coils, bucking coils 250 are depicted including taps which may be utilized in conjunction with electronic switches (not shown) to carry the effective number of turns in each coil. This is necessary due to the variance in mutual signal present whether utilizing transmitter coil pair 244 or transmitter coil pair 246. In this manner, bucking coils 250 may be accurately varied to optimize the isolation of receiver coil 248 whether utilizing transmitter coil pair 244 or transmitter coil pair 246 and as a consequence, receiver coil 248 may be alternately utilized in conjunction with two different transmitter pairs. The output of receiver coils 248 is then coupled as depicted in FIG. 5 via all or part of bucking coils 250 and shielded line 256 to amplifiers 252 and 254 to produce a deep receiver signal (DR) and a medium depth receiver signal (MR).

Those skilled in the art will appreciate that bucking coils 250 will typically include fewer turns than receiver coil 248 because bucking coils 250 are located closer to transmitter coil pair 244 and transmitter pair 246, making their mutual coupling per turn greater. Thus, as transmitter 216 provides an alternating current to each transmitter coil the resultant induced voltage in the receiver coil array (coils 248 and 250) from the formation will include two components. One component is the in-phase induced voltage and the second component is the out-of-phase induced voltage, where the phase is relative to the current in transmitter coil pair 244 or transmitter pair 246. Phase sensitive receiver circuit 218 receives the phase reference signal via line 217 from transmitter 216 and produces an in-phase signal and an out-of-phase signal for recording and analysis.

As can be seen, the coil array of the dual high resolution induction tool 210 of the present invention is completely symmetrical about main receiver coil 248. Further, both transmitter coil pair 244 and transmitter coil pair 246 are also symmetrical about receiver coil 248. This arrangement differs from generally known coil arrays which are reciprocally symmetrical, that is, the transmitter array is a mirror image of the receiver array. The basic theory of this symmetrical array in a single induction tool may be readily understood upon reference to the aforementioned referenced application.

With reference now to FIG. 8, there is depicted a simplified schematic diagram of one embodiment of dual high resolution induction tool 210 of the present invention. As can be seen, dual high resolution induction tool 210 preferably includes a processor 258 which is utilized to control and order the various operations necessary to operate dual high resolution tool 210. Processors 258 will control, in a manner well known in the art, waveform generator 260 which generates the alternating frequency signal which will be utilized to inductively produce an electromagnetic field which will in turn cause eddy currents to flow within the formation. Waveform generator 260 is also utilized to provide phase reference signals $f_c$ and $f_c + \pi/2$ which will be utilized in conjunction with the phase sensitive receiver circuit.

The output of waveform generator 260 is then coupled via high-power isolation switches 264 through amplifiers 262 to transformer 266. Transformer 266, in conjunction with high-power isolation switches 264, is then utilized to couple the output of waveform generator 260 to either transmitter coil pair 244 or transmitter coil pair 246. High-power isolation switches 264 are utilized to ensure that cross talk will be minimized by holding either transmitter coil pair 244 or transmitter coil pair 246 at an open circuit when not energized. This is necessary when utilizing alternate measurements of two different depths of investigation to prevent cross talk caused by large circulating currents which may be induced in one transmitter coil pair when the other transmitter coil pair is energized. In actual practice, the applicants have discovered that transmitter coil pair 244, the deep investigation coil pair will induce large circulating currents in transmitter coil pair 246 when energized. Therefore, one alternate embodiment of the present invention may utilize a high-power isolation switch 264 only to isolate transmitter coil pair 246 during energization of transmitter coil pair 244. Also coupled to the secondary of transformer 266 is a winding including reference resistor 268 which is utilized to generate a reference voltage. Those skilled in the art will appreciate that all measurements utilized in tools of this type are ratiometric and it is necessary therefore to have a reference voltage against which to measure the received signal.

Calibration/zero switch 270 is also controlled by processor 258 and is utilized to provide a calibration signal or zero signal to the input of the receiver electronics in a manner which will be explained in greater detail below. As can be seen, the deep receiver signal (DR) and the medium depth receiver signal (MR) are alternately coupled to the receiver electronics via DR/MR switch 272 under the control of processor 258. Measurement/calibration switch 274 may then be utilized, as will be obvious to those skilled in the art upon reference to FIG. 6, to couple one of four inputs to the receiver electronics: a calibration voltage signal; a zero voltage signal; a deep receiver signal (DR); or a medium depth receiver signal (MR).

In the embodiment of the present invention disclosed in FIG. 8, processor 258 may then be utilized to alternately couple one of these four signals to the receiver electronic circuitry. Those skilled in the art of induction tools will realize upon reference to the foregoing that alternate embodiments of the present invention are possible in which the deep transmitter coil pair and medium depth transmitter coil pair are simultaneously energized at two different frequencies. Similarly, the deep transmitter coil pair and medium depth transmitter coil pair may be energized at identical frequencies with a modulation signal incorporated to permit the receiver circuitry to distinguish the source of the transmitted signal.

The receiver electronics circuitry of the present invention is then utilized to couple the receiver signal through a low noise preamplifier 276. Next, low phase shift band pass filter 278 is utilized to further prepare the received signal for analysis. Amplifiers 280 are then utilized to further amplify the received signal and the in-phase and out-of-phase components are then applied to phase sensitive detectors 282 which, in conjunction with the phase reference signal provided by waveform generator 260, will output a signal having a DC component and a large number of harmonics. Low pass filters 284 are utilized to attenuate these harmonics to an insignificant level. Low pass filters 284 are preferably fast settling filters which permit rapid sampling of received data. The D.C. output of each low pass filter 284 is then applied to an analog-to-digital converter 286 and the resultant digital signal is coupled via data bus wires 288 to processor 258. Processor 258 may then, in a manner well known in the art, couple the measured data through an interface module 290 onto logging cable 228 for transmission to the earth's surface for correction and computation by computer 232 (see FIG. 7).

Thus, it should be appreciated by those skilled in the art that the applicants have developed a dual high resolution induction tool which utilizes only seven coils and which permits investigation of a formation to multiple depths without degradation of the vertical resolution of either coil array. When compared with known dual induction arrays which utilize ten or eleven coils the reliability and accuracy of this tool will be far superior.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. For example, it is possible to implement the dual high resolution induction tool of the present invention by exchanging receiver coils and transmitter coils. Thus by utilizing a single transmitter coil with symmetrically disposed variable transmitter bucking coils and multiple symmetrically disposed receiver coil pairs it will also be possible to implement two transmitter receiver arrays which will have different transmitter-to-receiver coil spacing (and thus different depths of investigation) while maintaining substantially identical vertical resolution for both arrays. It is therefore contemplated that the appended claims will cover any such modifications or embodiments that fall within the true scope of the invention.

What is claimed is:

1. An induction logging tool comprising:
   a mandrel having an axis of elongation;
   a central receiver coil disposed on said elongated mandrel and wound about the axis of elongation;
   a pair of bucking coils connected in series with said receiver coil, said bucking coils being symmetrically positioned about said receiver coil on said mandrel at substantially equal distances from said receiver coil and wound about the axis of elongation in opposite sense to said receiver coil;
   a pair of transmitter coils symmetrically positioned about said receiver coil on said mandrel at substantially equal distances from said receiver coil, said bucking coils being positioned between said receiver coil and said transmitter coils;
   a transmission signal source operatively connected with said pair of transmitter coils for coupling a transmission signal to said pair of transmitter coils; and
   receiver means coupled to said receiver coil for detecting a voltage induced therein and producing an output detection signal related to said induced voltage.

2. The induction logging tool of claim 1, wherein each of the pair of bucking coils has the same number of windings.

3. The induction logging tool of claim 2, wherein each of the pair of transmitter coils has the same number of windings.

4. The induction logging tool of claim 3, wherein each of the pair of bucking coils has the same number of windings.

5. The induction logging tool of claim 1, wherein said transmission signal source provides a periodic current signal and wherein said receiver means includes means for detecting the phase of said periodic current transmission signal source and further includes means for providing an output including an in-phase detection signal and an out-of-phase detection signal.

6. The induction logging tool of claim 1, further comprising a data processing means for receiving detected voltages from the receiving means and providing an output signal representative of formation characteristics, and recording means coupled to said data processing means for recording the output of said data processing means.

7. An induction logging tool comprising:
   (a) an insulating mandrel having a vertical axis of elongation;
   (b) a symmetrical coil system disposed on said insulating mandrel, said coil system including:
      a central coil array having:
         a main coil; and
         a first pair of coils, each coil of said first pair of coils having the same number of windings and being connected in series with said main coil, wherein said first pair of coils are wound in opposite sense to the main coil, one of said first pair of coils being positioned a distance d above the main coil and the other of said first pair of coils being positioned the distance d below the main coil; and
      an outboard coil system having:
         a second pair of coils, each coil of said second pair of coils having the same number of windings, one of said second pair of coils being positioned a distance D above the main coil, and the other of said second pair of coils being positioned the distance D below the main coil, wherein the distance D is greater than the distance d;
   (c) a transmitted signal source coupled with one of said central coil array and said outboard coil system; and
   (d) a receiver for coupling to the other of said central coil array and said outboard coil system.

8. An induction logging tool comprising:
   an insulated sonde;
   a coil array including a plurality of coils symmetrically disposed about a selected point on said insulated sonde wherein identical pairs of coils within said coil array are disposed on opposite sides of said selected point at substantially equal distance from said selected point, said plurality of coils comprising
      at least one central coil disposed at said selected point,
      a first set of three coils arranged above said at least one central coil, the coils of said first set of coils being wound in series and disposed symmetrically about one of said first set of three coils, and
      a second set of coils arranged below said at least one central coil, the coils of said second set being wound in series and disposed symmetrically about one of said second set of three coils;
   a transmission signal source coupled to said at least one central coil; and
   receiver means coupled to at least one of said first set of coils and said second set of three coils for detecting voltages induced therein.

9. A method of logging an earth formation with a sonde adapted to move through a borehole comprising the steps of:
   positioning the sonde in the borehole;
   applying a first excitation signal to a first pair of transmitter coils positioned symmetrically on a principal axis of the borehole, wherein each of said coils are spaced a first, equal distance from a reference point on the sonde;
   detecting the electromagnetic effect of said first excitation signal at a receiver coil array to obtain indications of characteristics of the formation at a first radial depth of investigation from the borehole, said receiver coil array including main windings and bucking windings, said bucking windings being wound in an opposite sense from the main windings and positioned symmetrically about said reference point;
   selectively coupling a receiver means for detecting voltages in the receiver coil array to equal numbers of said bucking windings spaced an equal distance on either side of the main winding, the number of windings of said bucking coils being selected to cancel mutual coupling from the first transmitter coil pair and from a portion of the formation nearest the sonde;

applying a second excitation signal to a second pair of transmitter coils positioned symmetrically on the principal axis of the borehole, wherein each of said coils are spaced a second, equal distance from the reference point on the sonde;

detecting the electromagnetic effect of said second excitation signal at the receiver coil array to obtain indications of characteristics of the formation on a second radial depth of investigation from the borehole;

selectively coupling the receiver means to equal numbers of said bucking windings spaced an equal distance on either side of the main winding, the number of windings of said bucking coils being selected to cancel mutual coupling from the second transmitter coil pair and from a portion of the formation nearest the sonde; and whereby approximately the same vertical resolution is obtained at the first and second depths of investigation.

10. An induction logging tool comprising:
(a) an insulating mandrel having a vertical axis of elongation;
(b) a symmetrical coil system disposed on said insulating mandrel, said symmetrical coil system including:
a central coil array having:
a main coil wound about the axis of elongation; and
a first pair of coils, each coil of said first pair of coils having the same number of windings and being connected in series with the central coil, and being wound about the axis of elongation in opposite sense to the central coil, one coil of said first pair of coils being positioned a distance d above the central coil and the other coil of said first pair of coils being positioned the distance d below the central coil; and
an outboard coil system having:
a second pair of coils, each coil of said second pair of coils having the same number of windings, one coil of said second pair of coils being positioned above said central coil and said first pair of coils, and the other coil of said second pair of coils being positioned below said central coil and said first pair of coils,
a third pair of coils, each coil of said third pair of coils having the same number of windings, one coil of said third pair of coils being positioned above said central coil, said first pair of coils and said second pair of coils, and the other coil of said third pair of coils being positioned below said central coil, said first pair of coils and said second pair of coils, and
means for providing selective connection to said second coil pair and said third coil pair;
(c) a transmitted signal source coupled to one of said central coil array and said selective connection means of said outboard coil system; and
(d) a receiver coupled to the other of said central coil array and said selective connection means of said outboard coil system.

11. An induction logging tool comprising:
an elongated mandrel;
a receiver coil disposed on said elongated mandrel;
a pair of bucking coils connected in series with said receiver coil and symmetrically positioned about said receiver coil on said mandrel at a substantially equal distance from said receiver coil and wound in opposite sense to said receiver coil;
a first pair of transmitter coils symmetrically positioned about said receiver coil on said mandrel at a substantially equal distance from said receiver coil;
a second pair of transmitter coils symmetrically positioned about said receiver coil on said mandrel at a substantially equal distance from said receiver coil;
a transmission signal source for selectively applying a transmission signal to said first pair of transmitter coils and said second pair of transmitter coils; and
receiver means coupled to said receiver coil for detecting voltages induced therein.

12. The induction logging tool of claim 11, wherein said transmission signal source applies a transmission signal to said first pair of transmitter coils while open-circuiting the second pair of transmitter coils, and applies a transmission signal to said second pair of transmitter coils while open-circuiting the first pair of transmitter coils.

13. The induction logging tool of claim 12, wherein said bucking coils each have a tap between their respective coil ends and wherein the tool further comprises a control means for periodically coupling said receiver means to said taps in synchronization with the application of the transmission signal to one of said pairs of transmitter coils.

14. An induction logging tool comprising:
(a) an insulating mandrel having a vertical axis of elongation;
(b) a symmetrical coil system disposed on said insulating mandrel, said symmetrical coil system including:
a central coil array having:
a main coil wound about the axis of elongation; and
a first pair of coils, each coil of said first pair of coils having the same number of windings and being connected in series with the central coil, and being wound about the axis of elongation in opposite sense to the central coil, one coil of said first pair of coils being positioned a distance d above the central coil and the other coil of said first pair of coils being positioned the distance d below the central coil; and
an outboard coil system having:
a second pair of coils, each coil of said second pair of coils having the same number of windings, one coil of said second pair of coils being positioned above said central coil and said first pair of coils, and the other coil of said second pair of coils being positioned below said central coil and said first pair of coils,
at least one further pair of coils, each coil of said at least one further pair of coils having the same number of windings, one coil of said at least one further pair of coils being positioned above said central coil, said first pair of coils and said second pair of coils, and the other coil of said at least one further pair of coils being positioned below said central coil, said first pair of coils and said second pair of coils, and
means for providing selective connection to said second coil pair and one of said at least one further coil pair;
(c) a transmitted signal source coupled to one of said central coil array and said selective connection means of said outboard coil system; and
(d) a receiver coupled to the other of said central coil array and said selective connection means of said outboard coil system.

* * * * *